(12) United States Patent
Prabhakar et al.

(10) Patent No.: US 8,261,277 B2
(45) Date of Patent: Sep. 4, 2012

(54) SYSTEM AND METHOD FOR DYNAMIC ALLOCATION OF RESOURCES IN A COMPUTING GRID

(75) Inventors: Giridhar M. Prabhakar, Bangalore (IN); Debasis Bal, Bangalore (IN); Gopi Subramanian, Bangalore (IN); Ramasubramanian Gangaikondan Sundararajan, Bangalore (IN); Babu Ozhur Narayanan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 1326 days.

(21) Appl. No.: 11/400,984

(22) Filed: Apr. 10, 2006

(65) Prior Publication Data
US 2007/0240161 A1 Oct. 11, 2007

(51) Int. Cl.
*G06F 9/46* (2006.01)
*G06F 15/16* (2006.01)

(52) U.S. Cl. ........ 718/104; 718/105; 709/201; 709/202; 709/203

(58) Field of Classification Search .......... 718/104–105; 709/201
See application file for complete search history.

(56) References Cited

U.S. PATENT DOCUMENTS

| | | | | |
|---|---|---|---|---|
| 6,353,844 B1 * | 3/2002 | Bitar et al. | ..................... | 718/102 |
| 6,681,240 B1 * | 1/2004 | Armstrong et al. | ........... | 718/104 |
| 6,785,889 B1 * | 8/2004 | Williams | ...................... | 718/104 |
| 7,058,947 B1 * | 6/2006 | Raja et al. | ..................... | 718/104 |
| 7,246,217 B1 * | 7/2007 | Tomkins et al. | ................ | 712/28 |
| 7,567,359 B2 * | 7/2009 | Tameshige et al. | .......... | 358/1.15 |
| 7,644,153 B2 * | 1/2010 | Talwar et al. | ................ | 709/224 |
| 7,660,887 B2 * | 2/2010 | Reedy et al. | .................. | 709/224 |
| 7,665,090 B1 * | 2/2010 | Tormasov et al. | ............ | 718/104 |
| 7,680,897 B1 * | 3/2010 | Carter et al. | ................... | 709/217 |
| 7,702,788 B2 * | 4/2010 | Devarakonda et al. | ....... | 709/226 |

(Continued)

FOREIGN PATENT DOCUMENTS
GB 2418274 A 3/2006

OTHER PUBLICATIONS

Wolski, R.; "Forecasting Network Performance to Support Dynamic Scheduling Using the Network Weather Service"; Proc. 6th IEEE Symposium on High Performance Distributed Computing, Portland, Oregon, 1997; pp. 316-325.

Ali, A., et al.; Job Monitoring in an Interactive Grid Analysis Environment; Available from http://cacr.library.caltech.edu/54/01/Chep_04_paper_Job_Monitoring-13-10.pdf, 2004.

(Continued)

*Primary Examiner* — Emerson Puente
*Assistant Examiner* — Adam Lee
(74) *Attorney, Agent, or Firm* — Richard A. DeCristofaro

(57) ABSTRACT

A system for dynamically allocating resources in a computing grid is provided. The system comprises a resource management component, a service level agreement (SLA) management component and a job scheduling component. The resource management component is configured to determine availability of a set of resources in a computing grid, for executing job requests submitted by users of the computing grid. The SLA management component is configured to manage service level agreements (SLAs) corresponding to the users and perform a negotiation of resources for the users submitting the job requests, in real-time, based on a resource steerability attribute associated with the job requests. The job-scheduling component is configured to schedule the job requests for the users, based on the resource steerability attribute associated with the job requests. The job requests comprise at least one of a job having batch characteristics and a job having interactive characteristics. The computing grid is configured to process the job based on the resource steerability attribute associated with the job request.

17 Claims, 4 Drawing Sheets

U.S. PATENT DOCUMENTS

| | | | |
|---|---|---|---|
| 2002/0049608 A1* | 4/2002 | Hartsell et al. | 705/1 |
| 2002/0120819 A1* | 8/2002 | Hickson | 711/152 |
| 2004/0010667 A1* | 1/2004 | Brenner | 711/158 |
| 2004/0267897 A1* | 12/2004 | Hill et al. | 709/217 |
| 2005/0165925 A1* | 7/2005 | Dan et al. | 709/224 |
| 2006/0218285 A1* | 9/2006 | Talwar et al. | 709/227 |
| 2006/0224741 A1* | 10/2006 | Jackson | 709/226 |
| 2007/0094665 A1* | 4/2007 | Jackson | 718/104 |
| 2007/0162908 A1* | 7/2007 | Erickson et al. | 718/104 |
| 2008/0216081 A1* | 9/2008 | Jackson | 718/104 |

OTHER PUBLICATIONS

Haili, X., et al.; "An Implementation of Interactive Jobs Submission for Grid Computing Portals"; Australasian Workshop on Grid Computing and eResearch, Conf. Res. Pract. Info. Tech., v 44, 2005; Available from http://crpit.com/confpapers/CRPITV44Xiao.pdf.

R. Buyya and M. Murshed; "GridSim: a toolkit for the modeling and simulation of distributed resource management and scheduling for Grid computing"; Concurrency and Computation: Practice and Experience 2002; 14:pp. 1175-1220 (DOI: 10.1002/cpe.710).

* cited by examiner

SYSTEM AND METHOD FOR DYNAMIC ALLOCATION OF RESOURCES IN A COMPUTING GRID

BACKGROUND

The invention relates generally to grid computing and more particularly to a system and method for dynamically allocating resources in an enterprise computing grid.

Enterprises typically use their computational resources in various modes, such as, in an interactive mode or in a batch mode, depending on the particular lifecycle stage of the application being executed on the grid. In general, enterprise grids allocate separate resources for interactive and batch mode usages. These usage modes may sometimes conflict with each other, since the resource requirements for interactive usage are generally more rigorous, immediate and sometimes low volume as compared to the usually higher volume and temporally less rigorous demands of large-scale parallel batch executions.

As will be appreciated by those skilled in the art, a batch execution refers to a process by which users submit a job via a web interface or a front end, or a script file of instructions. The instructions notify an executing machine of a location of the input files, the executable and the output files along with job status information. While many variants of this scheme exist, the common feature of batch jobs is that once a batch job is submitted, users do not have control over the execution of the job except for terminal instructions such as to interrupt or suspend the job. Interactive jobs, on the other hand, are jobs in which a user is able to give frequent inputs to the running application, and obtain frequent outputs from the application. In effect, users running interactive jobs have a capability to communicate with an application at near real time speeds. Furthermore, jobs may be generally characterized by a spectrum of response times, in which purely batch and purely interactive jobs represent the extremes. Interactive jobs, in general, require to be scheduled and executed immediately and the impact they create on the resource workload on a grid is in proportion to the number of jobs submitted in the grid. On the other hand, batch jobs typically need to be queued and executed serially, thereby having a lesser impact on the resource workload on the grid.

It would therefore be desirable to develop an enterprise computing grid system that enables the dynamic allocation of computational resources needed for the execution of jobs with varying degrees of batch and interactive characteristics, based on the computational demands of applications that are in various stages of an application development life cycle.

BRIEF DESCRIPTION

In one embodiment, a system for dynamically allocating resources in a computing grid is provided. The system comprises a resource management component, a service level agreement (SLA) management component and a job scheduling component. The resource management component is configured to determine availability of a set of resources in a computing grid, for executing one or more job requests submitted by one or more users of the computing grid. The SLA management component is configured to manage one or more service level agreements (SLAs) corresponding to the one or more users. The SLA management component is further configured to perform a negotiation of resources for the one or more users submitting the one or more job requests, in real-time, based on a resource steerability attribute associated with the one or more job requests. The job-scheduling component is coupled to the resource management component and the SLA management component. The job-scheduling component is configured to schedule the one or more job requests for the one or more users, based on the resource steerability attribute associated with the one or more job requests. The job requests comprise at least one of a job having batch characteristics and a job having interactive characteristics and the computing grid is configured to process the at least one job based on the resource steerability attribute associated with the job request.

In another embodiment, a method for dynamically allocating resources in a computing grid is provided. The method comprises submitting one or more job requests to a computing grid. Each request is associated with one or more users of the grid. The method then comprises determining availability of a set of resources in the computing grid for executing the one or more job requests and defining a plurality of service attributes for the one or more users submitting the one or more job requests to the computing grid. The method finally comprises scheduling the one or more job requests for the one or more users based on a resource steerability attribute associated with the one or more job requests. The one or more job requests comprise at least one of a job having batch characteristics and a job having interactive characteristics and the computing grid is configured to process the at least one job based on the resource steerability attribute associated with the job request.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention disclose an enterprise computing grid system that is tunable to the workload on a grid comprised of jobs with varying degrees of batch and interactive characteristics. The computing grid system disclosed in accordance with embodiments of the present invention enables the dynamic allocation and optimal utilization of shared computing resources for applications throughout their development cycle by allocating computational resources to users with different degrees of steerability. As used herein, "steerability" refers to a degree to which a user or a process may control a computational resource, and is a factor that significantly influences the quality of service (QOS) in the computing grid system.

Figure 1:
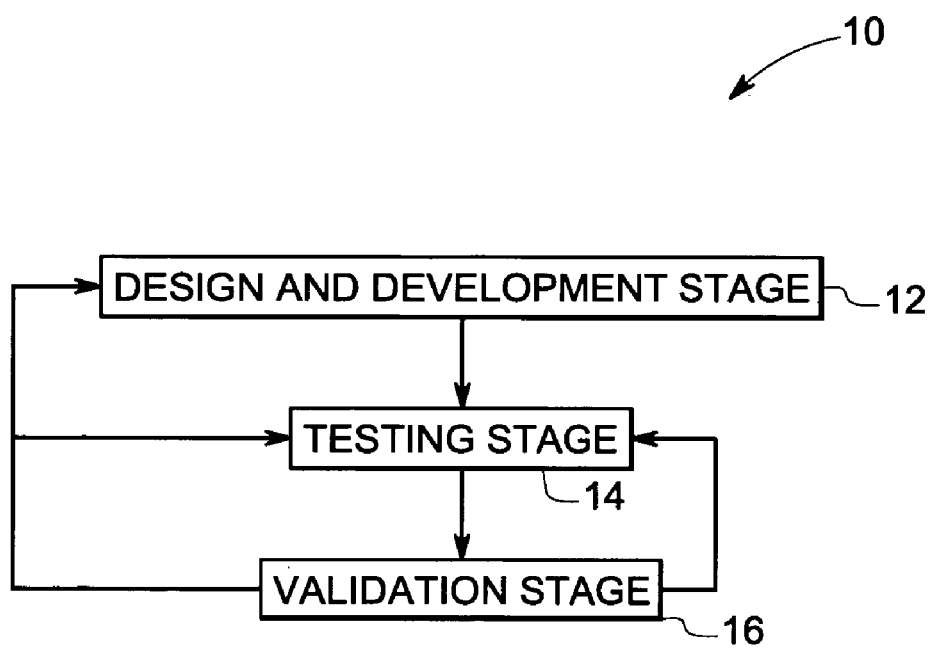
FIG. 1 is an exemplary illustration of the typical stages in an application development lifecycle.

FIG. 1 is an exemplary illustration of the typical stages in an application development lifecycle 10. As shown in FIG. 1, a typical software and algorithm development lifecycle in an enterprise grid system may be classified into three main stages, a design and development stage 12, a testing stage 14 and a validation stage 16.

Figure 2:
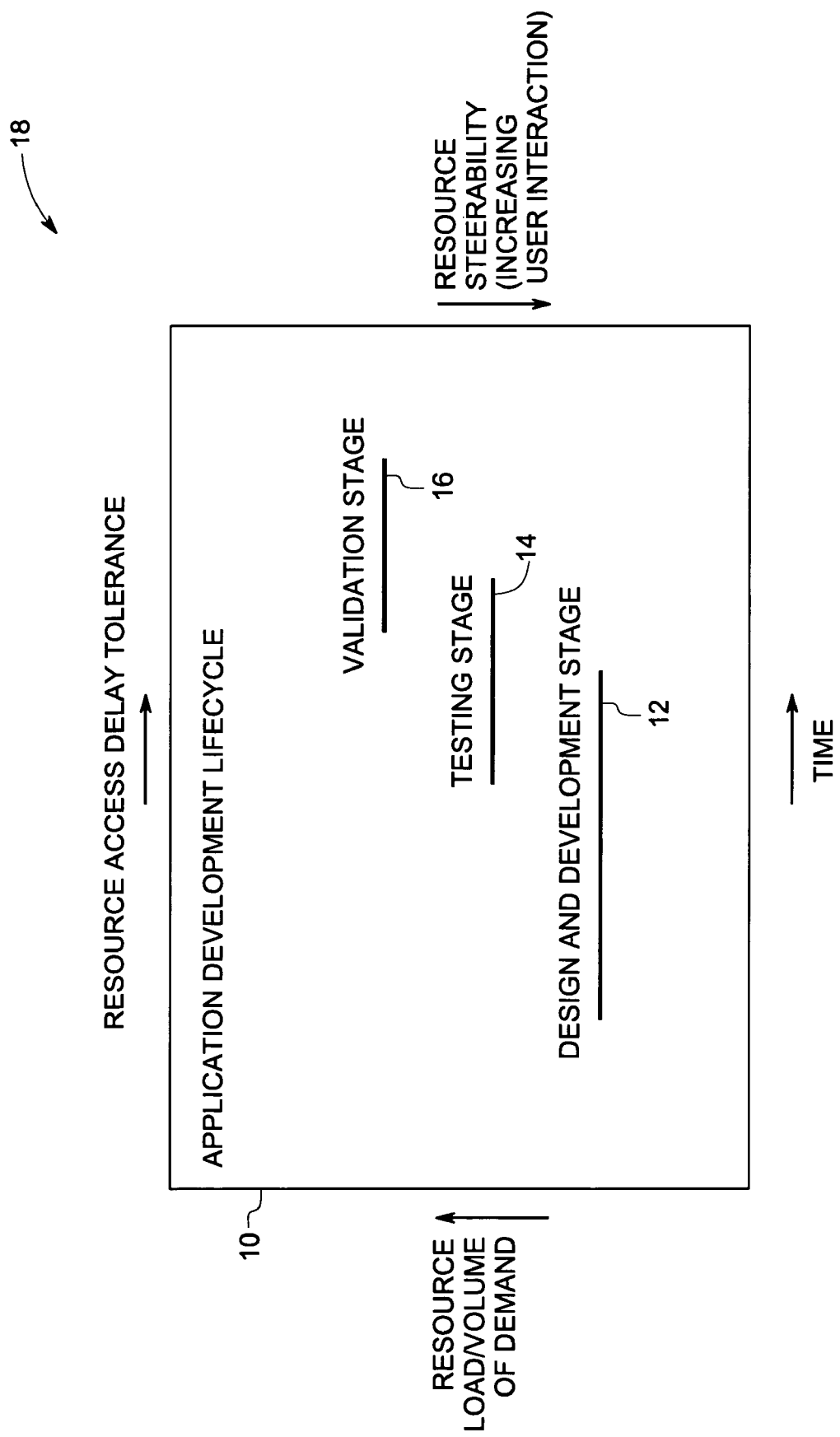
FIG. 2 is a graph illustrating the relationships between the stages in the application development lifecycle shown in FIG. 1, and their typical resource requirement characteristics.

FIG. 2 is a graph illustrating the relationships between the stages in the application development lifecycle 10 shown in FIG. 1 and their typical resource requirement characteristics. Referring to the graph 18 shown in FIG. 2, each stage in the application development lifecycle 10 is characterized by its demand for computing resources. During the design and development stage 12, there is less usage for high-end/high-performance computational resources, and more need for accessibility and "steerability" or controllability, of a resource. This is due to the fact that design and development processes are themselves entirely controlled and driven by a developer, who makes a free choice of the medium of development (such as, for example, the software or other resources used to design the application/algorithm). Since development is an iterative process, in general, the required resource may be accessed randomly and at high frequency by the developer. As may be observed from the graph 18 shown in FIG. 2, the tolerance for delays in accessing computational resources is relatively low during this stage.

The testing stage 14 is typically characterized by larger data computations, such as medium-to-high volume computations. As may be observed from the graph 18 shown in FIG. 2, the volume of demand for computational resources is usually the highest during this stage. The robustness of the developed application is often tested at this stage, and unexpected failures and errors in the application can occur at this stage. During this stage, applications and resources are more autonomous (i.e., less in control of the user and more in the control of the grid) than in the design and development stage 12, as the user sets test parameters and allows the computation to occur without their interference, even though monitoring of the execution may be performed in various degrees, during this stage. As will be appreciated by those skilled in the art, the optimization of computations and resource usage during the testing stage 14 yields good benefits, since the duration of access of the computational infrastructure can be large, although the access frequency may be lower than in the design and development stage 12. As may be observed from the graph 18 shown in FIG. 2, the tolerance for delays in accessing resources during the testing stage 14 are higher, and iterative refinement of the algorithm is reduced as compared to the design and development stage 12. It may be further noted that, at this stage it is essential to accurately and comprehensively communicate failure data for the application, and make this data accessible to the user for analysis. Furthermore, and as indicated in FIG. 1, if tests in the testing stage fail, then the user returns to the design and development stage 12.

The validation stage 16 generally consumes the least time. Processes are often not iterative, expect in situations when unusual defects are discovered in the application and the developer goes back to either the design and development stage 12 or the testing stage 14 (as indicated in FIG. 1). As may be observed from the graph 18 shown in FIG. 2, the usage of resources may be heavy during this stage, but this is usually for a short duration, and the tolerance for delays in resource availability is typically the highest during this stage. Furthermore, computational processes and resources have the most autonomy (controlled to the least degree by the user and the greatest degree by the grid) during this stage, since the developer sets the test parameters and thereafter need not interfere with the computational process.

Referring again to the graph shown in FIG. 2, the computational infrastructure may experience a wide range of demands and loads, within a single development lifecycle. Further, the usage of a resource need not necessarily assume either a batch or an interactive character based on a particular stage in the application development lifecycle. For example, a model geared towards interactive execution, may have interactivity as a defining feature of the application. On the other hand, post-developmental testing and validation phases involving large-scale visualization of results may be interactive applications.

As will be described in greater detail below, the computing grid system developed in accordance with embodiments of the present invention enables the optimal utilization of resources during all stages of the application development lifecycle. The "optimal utilization of resources" is achieved by enabling the interactive usage of resources during the design and development stage on the grid, rather than allocating separate, atomic resources to individual users or groups at this stage. Further, the resources needed for the design and development stage are integrated with the testing stage, thereby reducing resource provisioning costs, and optimizing resource usage. In addition, the computing grid system disclosed in accordance with embodiments of the present invention is "tunable" to the nature of the workload in the grid thereby optimizing the usage of resources throughout the development lifecycle of an application. It may be appreciated by those skilled in the art that the computing grid disclosed in accordance with embodiments of the present invention may be used to optimize resource usage in different environments, such as, for example, enterprise data centers, compute farms, research and development environments, (the basic principles of which are applicable to optimizing the use of a general set of resources that can by definition be characterized by different degrees of batch and interactive usage), and is not limited to optimizing resource usage for a software development environment alone.

Figure 3:
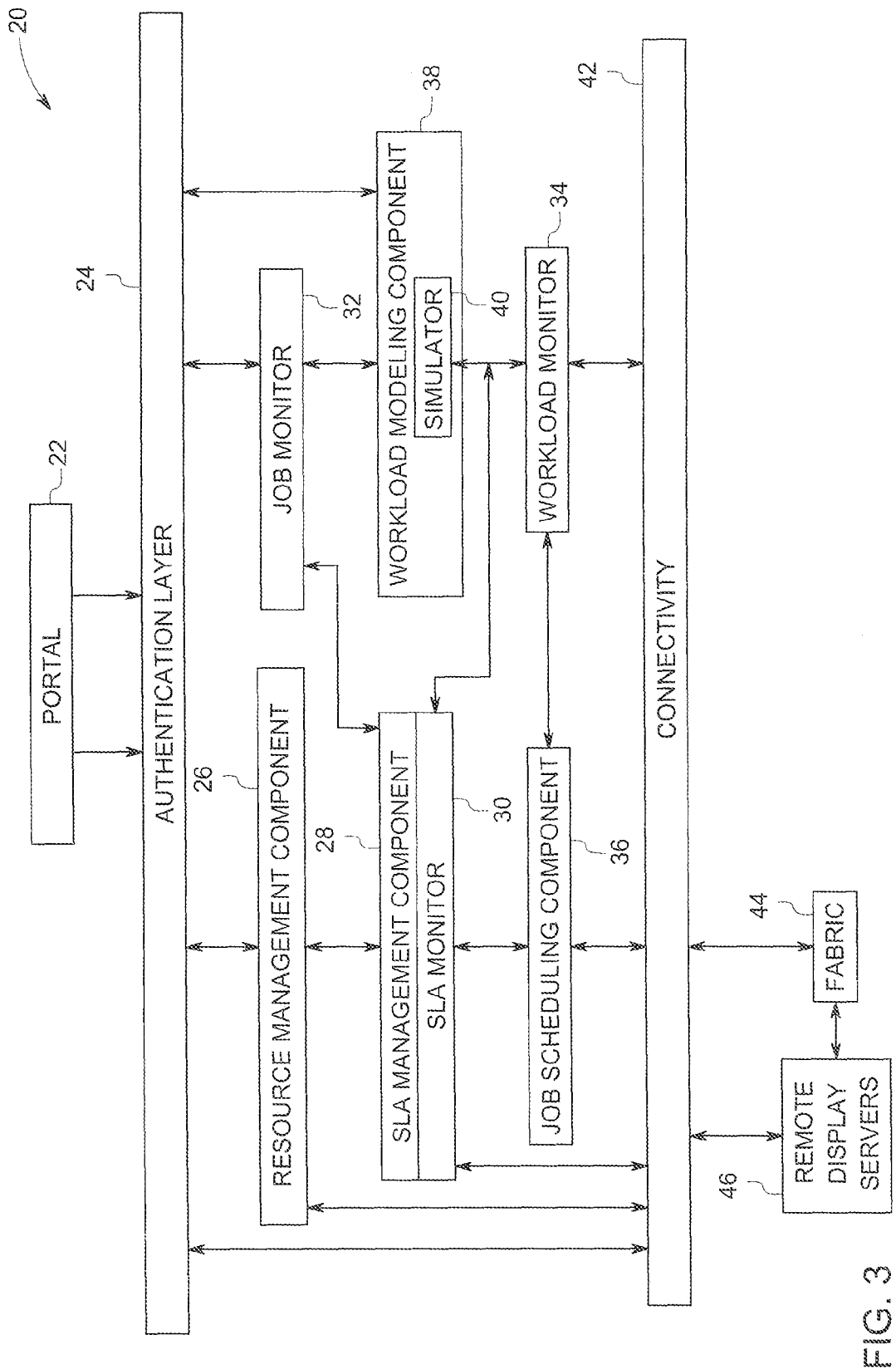
FIG. 3 is a high-level illustration of a system for dynamically allocating resources in a computing grid, in accordance with an embodiment of the present invention.

FIG. 3 is a high-level illustration of a system for dynamically allocating resources in a computing grid, in accordance with an embodiment of the present invention. As will be appreciated by those skilled in the art, a "computing grid" refers to a collection of interconnected (networked) grid components under the control of a grid management entity, such as, for example, a business entity responsible for managing the assignment of resources to services in order to meet its business goals.

Referring to FIG. 3, the computing grid system 20 includes a resource management component 26, a service level agreement (SLA) management component 28 and a job scheduling component 36. The computing grid system 20 also includes a portal 22, an authentication layer 24, an SLA monitor 30, a workload modeling component 38, a workload monitor 34 and a job monitor 32. The portal 22 is a gateway into the computing grid system 20. In one embodiment, the portal 22 may be a lightweight application executed on a thin client or a user's desktop, and may interface with a user's desktop application. The portal 22 may also act as a remote display client to enable a remote display viewing application such as a remote desktop. A user may enter the portal 22 through an authentication protocol, such as, for example, a username and a password, and communicate this to the computing grid system 20 via a secure network, or using encryption protocols.

The portal may be a software client that acts as a means to enter the grid. Further, the portal 22 may not necessarily be a part of the system grid architecture 20, although the system grid 20 itself may offer a basic portal. In addition, portals may have various forms based on the application architecture, which will be using the grid. Portals can be either web based systems or thick/thin clients or even a mobile/smart device interface. The portal is a single point where all these interfaces interact with the grid. Users may also write or use their own portals, provided that these portals conform to the standards and specifications of the corresponding grid. The disclosed grid system includes means to create a portal, or may offer a ready-made portal. To take advantage of the grid system described herein, ideally the portal will have the ability to receive and display data from the job monitor, the SLA monitor, the resource management component and the job scheduling component and any other features or modules as will be described in greater detail below.

The authentication layer 24 verifies a user's identity into the computing grid system 20, to determine if the user logged in is a trusted user. In addition to providing standard authentication services for the computing grid system 20, the authentication layer 24 may also provide an activity monitor and a log, which may be accessed by administrators to monitor suspicious activities. In order to initially access the computing grid system 20, users are registered with an administrator, and the registration information is verified at the time of user authentication.

The resource management component 26 is configured to determine the availability of a set of resources in the computing grid system 20, for executing one or more job requests submitted by one or more users of the computing grid system 20. In one embodiment, the job requests may include jobs having batch characteristics and/or jobs having interactive characteristics. As used herein, a job having batch characteristics is referred to as a batch job and a job having interactive characteristics is referred to as an interactive job. Resources on the computing grid include all components of the grid that enable or facilitate computation. The resources may include computational resources and storage resources. Computational resources may include, for example, Central Processing Unit (CPU), computational co-processors such as the Graphics Processing Unit (GPU), dedicated compute hardware such as Floating Point Gate Arrays (FPGA), hardware that facilitates communication and connectivity such as networks, and other computational hardware. Computational resources may also include firmware, software, software licenses and middleware such as operating systems, applications and programs, etc. Storage resources may include, for example, hard disk storage and Random Access Memory (RAM), and other hardware or software devices that facilitate data access. In a particular embodiment and as will be described in greater detail below, the resource management component 26 includes a resource steerability attribute for each job request submitted by each user of the computing grid system 20.

The resource management component 26 also includes a plurality of resource request attributes corresponding to each job request. The resource request attributes may include an autonomy level of the requested resource, such as, for example, an interactive application or a batch application, or the degree of batch or interactive character (i.e., the resource steerability attribute) the access priority and delay tolerance of the requested resource, (for example, at the development stage, access priority is high and delay tolerance is low), the weight of the requested resource (for example, during the algorithm development stage, lightweight resources are required whereas for the testing stage, heavy usage of compute resources is expected), specific software and hardware attributes, such as, for example, a request for license of a particular software or a particular machine within a specified CPU frequency/RAM size.

The SLA management component 28 is configured to manage one or more service level agreements (SLAs) corresponding to each user. As will be appreciated by those skilled in the art, an SLA refers to a contract between a provider of a service and a user of that service and specifies the level of service that is expected during the term of the agreement between the service provider and the user. The SLA management component 28 includes one or more algorithms to determine a set of available services that can be offered to users based on current and projected workloads on the computing grid system 20, and also penalties and conditions that may be imposed to users in case of noncompliance with SLAs. To optimize and facilitate the stability and success of the workload cycles and resource usage patterns of the system grid 20, the SLA management component may also provide one or more SLA templates to a user to enable the re-use of existing SLAs. The SLA templates may be pre-determined or created based on an analysis of historical SLA data. Furthermore, the SLAs for each user are formulated to incorporate graceful degradations in meeting turnaround time, response time and other service attributes, where the difference between the estimated value of the attribute and the actual delivered value may be readjusted in the price of the usage of resources in the computing grid system 20.

The SLAs that are managed by the SLA management component 28, are defined by a plurality of service attributes. As used herein, "service attributes" refer to a set of performance metrics that the service provider promises to meet while delivering a particular service to the user. In accordance with the present embodiment, the service attributes may include, for example, a memory attribute, a Quality of Service (QOS) attribute, a network computing speed attribute and a delay penalty attribute. In a particular embodiment, a resource steerability attribute for each resource requested by a user is also included as part of each SLA. The steerability of a resource facilitates the optimal usage of resources in the computing grid system 20, in a manner as will be described in greater detail below.

The SLA management component 28 is further configured to perform a negotiation or a re-negotiation of resources for each user submitting a job request, in real-time based on the resource steerability attribute associated with each job request. In an exemplary scenario, if a user uses a software resource on the computing grid system 20, and the software is currently being used by a person other than the owner, for running a batch application, the owner of the software resource may request interactive usage of this software. In this situation, it is necessary that the request be immediately honored, since the priority of the usage of the resource belongs to the owner. In accordance with embodiments of the present invention, an SLA formulated for such a user incorporates a requirement that the owner of the resource may abruptly request usage of the resource for certain periods of time. In other words, the SLA incorporates the requirement that the resource may not be highly steerable by the batch user, but may be highly steerable by the owner. The SLA may further be formulated to enable the batch user to not be charged a greater amount than if the resource were more completely under his/her control. In other words, the usage of the resource is charged according to the "steerability" of the resource as one of the important factors in the SLA.

Ownership of a computing resource on the grid may accrue in either of two ways, the user may volunteer a resource they own to the grid, or the user may purchase or lease from the grid, the degree of steerability required by them to execute a certain job, via the SLA. In such cases when the particular computing resource is owned by the user for a pre-determined period of time, all SLAs made with other users requesting the particular resource must honor the request of the resource owner with a higher priority during that time, with the hierarchy of ownership itself being determined by temporal precedence (i.e., the temporally first owner being given the highest priority and so on). The operation of the system grid 20 may be made more flexible through the SLA negotiation and re-negotiation between users and the grid. Furthermore, negotiation between users may also be allowed to further increase the flexibility of operation of the system grid.

In another exemplary scenario, a request for interactive usage of a resource may necessitate the interruption of a batch job that is being run using that resource. The user requesting the interactive job may then submit, or the SLA management component 28 may, with the user's permission, submit on behalf of the user, an SLA negotiation request to the user running the batch job. In such a situation, an SLA may be formulated to provide the batch user a series of options on job completion time vs. usage charge allowing the batch user to choose to either negotiate the usage, or the SLA may make the usage of the resource non-negotiable in the beginning of the application itself. Such a negotiation may also be augmented by direct personal negotiation between the users. In all cases, priority is given to honoring SLAs in the order in which they were contracted, taking into account the degree of steerability or ownership of the resource as described herein. SLAs that are successfully contracted and executed may be recorded for future reference and re-use. This is particularly beneficial in the case of recurrent patterns of usage of resources on the computing grid.

Referring to FIG. 3 again, in certain embodiments, the SLA management component 28 may be coupled to an SLA monitor 30. The SLA monitor 30 is configured to monitor compliance of the SLAs, corresponding to each user. The SLA monitor 30 includes algorithms for measuring deviation from compliance. The deviations may then be communicated to the SLA management component 28, which in turn evaluates compensatory measures to be taken for the various deviations. As will be described in greater detail below, the SLA monitor 30 also communicates with a workload-modeling component 38 to provide regular statistical feedback on the degree to which SLAs are being honored by the computing grid system 20.

The workload modeling component 38 is configured to generate a current and predicted workload model of one or more workload characteristics of the computing grid system 20. As used herein, "workload characteristics" refer to the degree to which resources on the computing grid are being used, such as, for example, the CPU time, % CPU loaded, amount and type of RAM memory used, amount of storage used, and the time it takes to complete a job. In one embodiment, the workload-modeling component 38 includes a simulator 40 to dynamically create a model of the computing grid system 20 that is tunable to both batch and interactive workload characteristics. As will be appreciated by those skilled in the art, the nature of the usage of resources in batch modes in the computing grid system 20 may not exhibit regular patterns and interactive usage of resources may impose certain uncertainties. For example, an interactive session may not have a known termination time, predictable task sequence, or a predetermined resource usage.

Many grid simulators, (such as, for example, GridSim) are known in the art and may be used to model the behavior of the computing grid system 20. The simulator 40 uses a set of algorithms, models and data processing modules in order to produce a model for the current state of the computing grid system 20. The model developed by the simulator 40 provides projections on the behavior of the workloads of the computing grid system 20, the quality of service and other relevant attributes, along with expected error bounds on these projections. These projections may be used by the SLA management component 28 and a job scheduling component 36, in order to either amend the SLAs or to reconfigure the jobs submitted on the computing grid system 20 to achieve greater compliance with the SLAs, and to optimize computational performance of the computing grid system 20. In certain embodiments, the workload modeling component 38 may be coupled to a workload monitor 34. The workload modeling component 38 uses the information from the workload monitor 34 and conveys job scheduling information to the job scheduling component 36 (described below) to enable optimal throughput and turnaround times. In one embodiment, the workload monitor 34 is configured to evaluate the workload characteristics and job performance characteristics of the computing grid system 20.

As used herein, "job performance characteristics" refer to computational performance, and include, but are not limited to parameters such as ratio of actual to estimated completion time, actual to estimated resource usage, and comparison to output from computational demand estimation models. In addition to ratios, absolute and relative deviations can form a part of these characteristics. These characteristics may be recorded with corresponding load levels, both batch and interactive on the grid. Furthermore, CPU time, memory consumed, computational power measured in units such as Floating Point Operations Per Second (FLOPS), data transfer rate, and other attributes of a job such as attributes mentioned in the SLA for the job, the success rate for SLAs on the same or similar jobs, may also be a part of job performance characteristics. As will be appreciated by those skilled in the art, workload characteristics are measured for the grid, whereas job performance characteristics are attributes measured for each individual job or task on the grid.

The workload monitor 34 communicates with the job-scheduling component 36 on the current state of the computing grid system 20, such as the available resources for batch/interactive execution, and the number and type of steerable jobs currently executed on the computing grid system 20. As mentioned above, these jobs may have batch or interactive attributes to various degrees. These evaluations may then be sent to the simulator 40, which in turn incorporates this information into its models. The workload monitor 34 may also perform other functions, such as providing information to the portal 22 on the state of the computing grid system 20.

The workload monitor 34 may also work in conjunction with the authentication layer 24 to monitor suspicious usage and maintain use logs. The workload monitor 34 may further assist the job-scheduling component 36 in steering the computing grid system 20 through various degrees of batch and interactive usage. The workload monitor 34 may additionally provide a feedback mechanism, in conjunction with the simulator 40, to optimize usage of resources on the computing grid system 20.

The job-scheduling component 36 is coupled to the resource management component 26 and the SLA management component 28. The job-scheduling component 36 is configured to schedule a job request for a user, based on the resource steerability attribute associated with the job requests, along with other attributes requested for the job such as CPU, storage, memory and software requirements. The job-scheduling component 36 is further configured to make decisions on steering computational resources on the computing grid system 20 based on the resource steerability attribute. The job-scheduling component 36 obtains inputs from the workload-modeling component 38, the SLA monitor 30, the workload monitor 34, the resource management component 26, the connectivity layer 42 and the fabric layer 44, which are described in greater detail below. These inputs are used to determine the spatial and temporal location of the various jobs scheduled on the computing grid system 20. As will be appreciated by those skilled in the art, a major difference between batch jobs and interactive jobs is that batch jobs may be executed in a queue, and interactive jobs must be executed immediately, causing a greater stress on resource usage and consequently leading to lower computational performance. Accordingly, batch jobs and interactive jobs are generally scheduled using different approaches or algorithms. In accordance with the present embodiment, the job-scheduling component 36 incorporates algorithms to dynamically schedule resources for the jobs being executed on the computing grid system 20 based on the workload characteristics of the computing grid system 20, and the job requirements.

The job-scheduling component 36 is further configured to schedule jobs independently and control job execution on the computing grid system 20 directly to enable the tunability of the computing grid system 20 based on workload characteristics. Scheduling of tasks may be thought of at the application level or at the resource level, with the aim being to balance policy enforcement and optimal resource usage. A large number of scheduling algorithms are well known in the art for monolithic computing systems, such as the round-robin scheme, fair share scheme, shortest-process-next, shortest-remaining-time, etc. Optimal scheduling algorithms depend on the configuration of resources on the grid. In one embodiment, the job scheduling component 36 may use a simple round-robin methodology, in which the order of task execution is influenced by the steerability parameter, and SLA negotiation, as detailed in the previous sections. Other embodiments may use heuristic methodologies, augmented by the workload modeling component 38 and the SLA management component 28. In addition, a meta-scheduler may be used to pass on sets of jobs to individual schedulers, each controlling various parts of the grid.

The job monitor 32 is configured to display a job request status and a job history status corresponding to each job request. The job request status may include, for example, information on whether the job has started, what resources have been allocated, how much time is pending for the job to start, SLA authorization/approval status etc., and the job history status may include, for example, time elapsed since the start of the job, CPU time and memory consumed, a history of similar jobs submitted by the user, details on resource checkpointing or SLA negotiation or re-negotiation that have been performed in the past, etc. The job monitor 32 may be connected to the portal 22 through the authentication layer 24. The job monitor 32 is configured to display a user's job, the job history, and also the status of the computing grid system 20. In some embodiments, the job monitor 32 is configured to enable a user to interactively steer their submitted jobs. As discussed herein, the term "steer" refers to the ability to control the internal behavior of an individual job and also to control how, when and where a job may be scheduled on the computing grid system 20, and the computing resources needed to execute a particular job. The term "steer" also refers to the ownership of particular resources and their components by the user. As mentioned above, the degree to which the job is steerable by a user is determined by an SLA, via the SLA management component 28.

The resources in the computing grid system 20 reside in the fabric layer 44. As mentioned above, the resources may include computational resources and storage resources. The remote display servers 46 operate in a manner similar to a remote desktop and are configured to display the interactive jobs being executed in the computing system grid 20. The remote display servers 46 are further configured to communicate the displayed image as a pixel stream via the network/connectivity layer 42 to a user.

Figure 4:
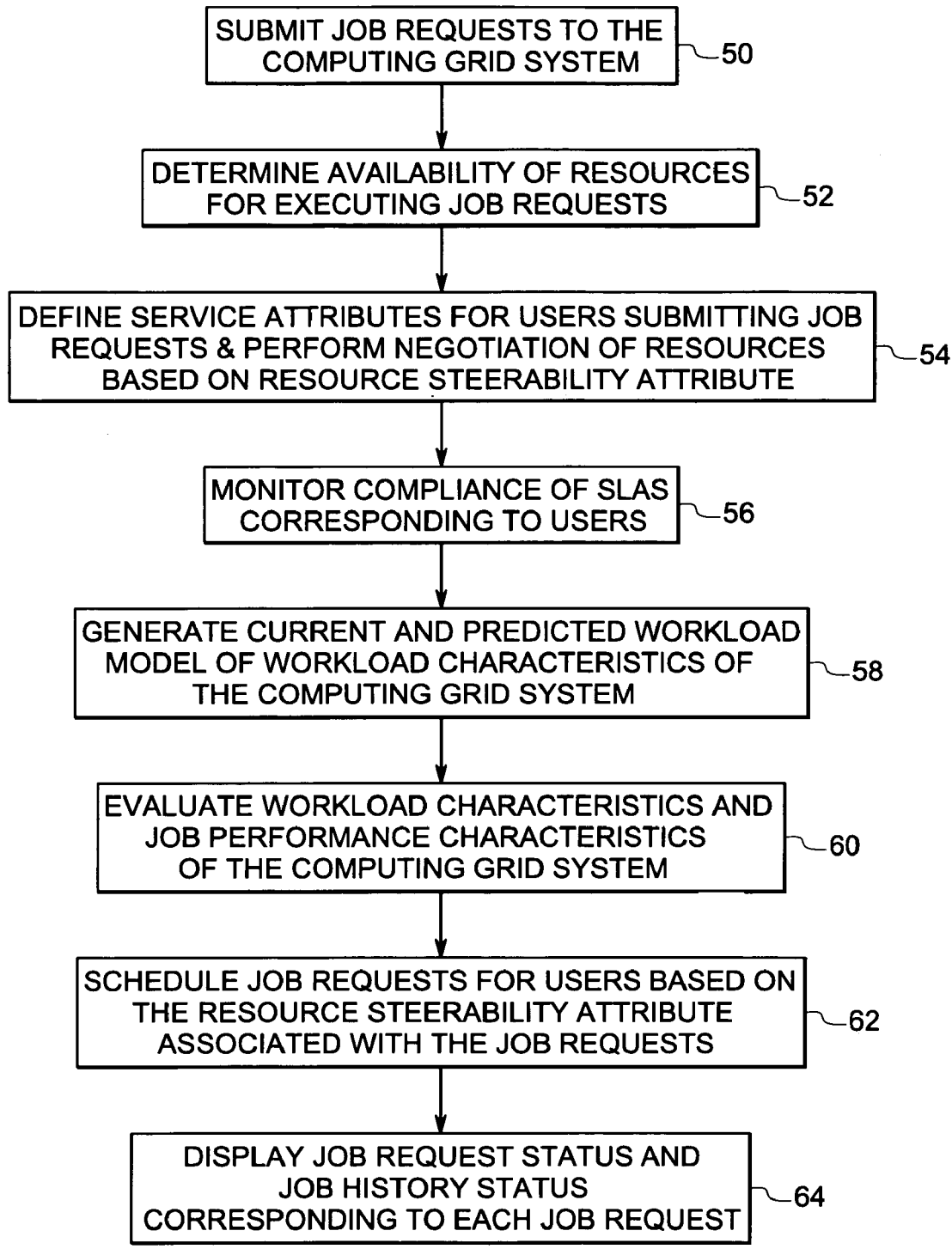
FIG. 4 is a flowchart of exemplary logic including exemplary steps for dynamically allocating computing resources in a computing grid, in accordance with one embodiment of the present invention.

FIG. 4 is a flowchart of exemplary logic including exemplary steps for dynamically allocating computing resources in a computing grid, in accordance with one embodiment of the present invention. In step 50, one or more job requests are submitted to the computing grid system 20, by one or more users. As mentioned above, the job requests include at least one of a job having batch characteristics and a job having interactive characteristics, referred to as a batch job and an interactive job respectively. In step 52, the availability of a set of resources for executing the one or more job requests is determined. In step 54, a plurality of service attributes for the one or more users submitting the one or more job requests to the computing grid system 20 are defined. As mentioned above, the plurality of service attributes include a resource steerability attribute, a memory attribute, a Quality of Service (QOS) attribute, a network computing speed attribute and a delay penalty attribute. In one embodiment, and as described above, a negotiation or re-negotiation of resources for the one or more users submitting the one or more job requests, is performed, in real-time, based on the resource steerability attribute. In step 56, the compliance of the one or more SLAs corresponding to the one or more users is monitored. In step 58, a current and predicted workload model of one or more workload characteristics of the computing grid system 20 is generated. In step 60, the one or more workload characteristics and one or more job performance characteristics of the computing grid system 20 are evaluated. In step 62, the one or more job requests are scheduled for the one or more users based on the resource steerability attribute associated with the one or more job requests. In step 64, a job request status and a job history status corresponding to each job request is displayed.

The disclosed embodiments have several advantages including the ability to provide optimal provisioning and usage of resources throughout the application development lifecycle. The computing grid system described above enables the "interactive usage" of resources during the development stage in an application lifecycle, in contrast to the typical resource provisioning model used by existing enterprise grids, that generally allocate separate, atomic resources to individual users or groups in the development stage of the application lifecycle. In addition, the disclosed computing grid system enables the integration of resources needed for the development stage with the testing stage to reduce resource provisioning costs and to optimize resource usage. Furthermore, since the computing grid system developed in accordance with embodiments of the present invention is tunable to the nature of the workload, the usage of resources is optimized throughout the development lifecycle.

As will be appreciated by those skilled in the art, enterprises typically allocate separate resources for model development. It is generally complex to provide large-scale, high-end resources for the purposes of model development due to the high cost of maintaining separate batch and interactive system grids. Accordingly, interactive resources are usually medium-to low-end, resulting in the user being unable to examine very large datasets at one time. Developers often sift through the data a little at a time, with frequent interactions with their infrastructure providers to augment their storage or compute power when the size of the data fluctuates. This generally leads to longer development times, higher inaccuracies due to a smaller visual window to the data, and frequent delays due to infrastructure bottlenecks. The computing grid system developed in accordance with embodiments of the present invention enables the integration of these resources on the grid itself, thereby enabling the analysis of very large datasets. Furthermore, as the infrastructure is abstracted from the user and managed at the computing grid, delays and bottlenecks are not felt by the user. Consequently, the accuracy and turnaround time of model analysis is improved.

Furthermore, existing enterprise grids generally allocate resources for interactive usage to individual users and groups. Therefore, it becomes their responsibility to set up, maintain and upgrade their resources. This may result in financial and temporal overheads, which may delay the development phase. The computing grid system developed in accordance with embodiments of the present invention relieves the user from these overheads, by integrating these resources on the grid itself. In other words, when a user has to use a computing resource such as a software application in an interactive manner, the software or resources are purchased separately in order to ensure high availability of the resource for the user, and the software is not installed on the grid, as it has hitherto been complex to manage batch and interactive usages on the grid. In this situation, it becomes necessary for the user to assume responsibility to acquire individual computing resources. They usually also have to perform tasks such as maintenance, up-gradation, compliance, accountability with the sourcing department and their managers, along with ensuring the availability of appropriate accompanying computing resources such as hardware platforms etc. Using the system grid described herein, interactive usage is enabled in a grid environment, sparing the user the additional work of having to maintain, upgrade and account for software or computing resources. Therefore, such maintenance, etc., becomes a centralized activity managed by the grid system administrative authority.

In addition, the computing grid system developed in accordance with embodiments of the present invention enables advanced modeling and computation, advanced task sequences, such as large-scale computing followed by large-scale visualization, or large-scale computing preceded by large-scale distributed data mining. As will be appreciated by those skilled in the art, such activities are in general not possible using traditional enterprise grid systems that employ separate resources for batch and interactive jobs.

The computing grid system developed in accordance with embodiments of the present invention also centralizes the management, security and accounting for resources that are generally considered atomic and disparate. The computing grid system is configured to address all stages of the application/model development lifecycle, in contrast to traditional enterprise grid systems, which address only the compute intensive test phase. During the development lifecycle, resource usage modes exhibit various amounts of batch and interactive character. The disclosed computing grid system grid is tunable to the varying nature of the workload, takes into account the autonomy, or "steerability", of computing resources and allocates jobs according to the demand based on the stage of the request in the development lifecycle of an application.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for dynamically allocating resources in a computing grid, the system comprising:
   a resource management component tangibly embodied in a computing device and configured to determine availability of a set of resources in a computing grid, for executing a plurality of job requests submitted by a plurality of users of the computing grid;
   a service level agreement (SLA) management component tangibly embodied in the computing device and configured to manage a plurality of service level agreements (SLAs) corresponding to the plurality of users, wherein the service level agreement (SLA) management component is configured to perform a negotiation of resources for the plurality of users submitting the plurality of job requests, in real-time, based on a resource steerability attribute associated with each job request; and
   a job scheduling component tangibly embodied in the computing device and coupled to the resource management component and the SLA management component, the job scheduling component being configured to schedule the plurality of job requests for the plurality of users, based on the resource steerability attribute associated with each job request;
   wherein the resource steerability attribute defines a degree of interactivity required by the plurality of users to execute the plurality of job requests, using the set of resources in the computing grid;
   wherein the plurality of job requests comprise at least one of a job having a batch usage characteristic and a job having an interactive characteristic, and
   wherein the resource steerability attribute for a user who is an owner of the resource that requests the job having the interactive usage characteristic is allocated a higher priority on the computing grid than a user who is a non-owner of the resource that requests the job having the batch usage characteristic.

2. The system of claim 1, wherein the computing grid is an enterprise grid.

3. The system of claim 1, wherein the plurality of SLAs comprising the SLA management component comprises a plurality of service attributes for the plurality of users, and wherein the plurality of service attributes comprises at least one of a memory attribute, a Quality of Service (QOS) attribute, a network computing speed attribute and a delay penalty attribute.

4. The system of claim 1, further comprising a workload-modeling component configured to generate a current and predicted workload model of one or more workload characteristics of the computing grid.

5. The system of claim 4, further comprising a Service Level Agreement (SLA) monitor coupled to the workload-modeling component and the SLA management component, configured to monitor compliance of the plurality of service level agreements (SLAs) corresponding to the plurality of users.

6. The system of claim 4, further comprising a workload monitor coupled to the workload-modeling component, configured to evaluate the one or more workload characteristics and one or more job performance characteristics of the computing grid.

7. The system of claim 1, wherein the job scheduling component is further configured to dynamically schedule resources for the plurality of job requests being executed on the computing grid, based on one or more workload characteristics of the computing grid.

8. The system of claim 7, further comprising a job monitor coupled to the job scheduler configured to display at least one of a job request status and a job history status corresponding to the plurality of job requests.

9. A method for dynamically allocating resources in a computing grid, the method comprising:
submitting a plurality of job requests to a computing grid, each job request being associated with a plurality of users of the grid;
determining availability of a set of resources in the computing grid for executing the plurality of job requests;
defining a plurality of service attributes for the plurality of users submitting the plurality of job requests to the computing grid; and
scheduling the plurality of job requests for the plurality of users based on a resource steerability attribute associated with each job request;
wherein the resource steerability attribute defines a degree of interactivity required by the plurality of users to execute the plurality of job requests, using the set of resources in the computing grid;
wherein the plurality of job requests comprise at least one of a job having a batch characteristic and a job having an interactive usage characteristic, and
wherein the resource steerability attribute for a user who is an owner of the resource that requests the job having the interactive usage characteristic is allocated a higher priority on the computing grid than a user who is a non-owner of the resource that requests the job having the batch usage characteristic.

10. The method of claim 9, comprising performing a negotiation of resources for the plurality of users submitting the plurality of job requests, in real-time, based on the resource steerability attribute associated with each job request.

11. The method of claim 9, comprising managing a plurality of service level agreements (SLAs) corresponding to the plurality of users, wherein the plurality of SLAs comprise the plurality of service attributes.

12. The method of claim 11, wherein the plurality of service attributes comprise at least one of a memory attribute, a Quality of Service (QOS) attribute, a network computing speed attribute and a delay penalty attribute.

13. The method of claim 11, further comprising monitoring compliance of the plurality of service level agreements (SLAs) corresponding to the plurality of users.

14. The method of claim 9, comprising generating a current and predicted workload model of one or more workload characteristics of the computing grid.

15. The method of claim 14, comprising evaluating the one or more workload characteristics and one or more job performance characteristics of the computing grid.

16. The method of claim 9, comprising dynamically scheduling resources for the plurality of job requests being executed on the computing grid, based on a plurality of workload characteristics of the computing grid.

17. The method of claim 9, further comprising displaying at least one of a job request status and a job history status corresponding to the plurality of job requests.

\* \* \* \* \*